US012456571B2

(12) United States Patent
Chiu

(10) Patent No.: US 12,456,571 B2
(45) Date of Patent: Oct. 28, 2025

(54) THIN FILM INDUCTOR

(71) Applicant: CHILISIN ELECTRONICS CORP., Hsinchu County (TW)

(72) Inventor: Ming-Chieh Chiu, Taoyuan (TW)

(73) Assignee: CHILISIN ELECTRONICS CORP., Hsinchu County (TW)

( * ) Notice: Subject to any disclaimer, the term of this patent is extended or adjusted under 35 U.S.C. 154(b) by 841 days.

(21) Appl. No.: 17/697,942

(22) Filed: Mar. 18, 2022

(65) Prior Publication Data

US 2022/0406513 A1 Dec. 22, 2022

(30) Foreign Application Priority Data

Jun. 16, 2021 (TW) ................................ 110121806

(51) Int. Cl.
*H01F 5/00* (2006.01)
*H01F 27/24* (2006.01)
*H01F 27/28* (2006.01)
*H01F 27/32* (2006.01)
*H01F 41/12* (2006.01)

(52) U.S. Cl.
CPC ......... *H01F 27/2804* (2013.01); *H01F 27/24* (2013.01); *H01F 27/323* (2013.01); *H01F 41/122* (2013.01); *H01F 2027/2809* (2013.01)

(58) Field of Classification Search
CPC .................................................. H01F 27/2804
USPC .......................................................... 336/200
See application file for complete search history.

(56) References Cited

U.S. PATENT DOCUMENTS

2016/0180995 A1* 6/2016 Park .......................... H01F 3/10 29/606
2017/0140866 A1* 5/2017 Hong ...................... H01F 41/10
2017/0236633 A1* 8/2017 Park ...................... H01F 27/323 336/55
2018/0308612 A1 10/2018 Park et al.
2020/0168391 A1* 5/2020 Yang .................. H01F 17/0013

FOREIGN PATENT DOCUMENTS

CN 108074729 A 5/2018
CN 112086261 A 12/2020
CN 112908612 A 6/2021
TW I724965 B 4/2021

* cited by examiner

*Primary Examiner* — Ronald Hinson
(74) *Attorney, Agent, or Firm* — Li & Cai Intellectual Property Office

(57) ABSTRACT

A thin film inductor is provided. The thin film inductor includes a first coil assembly, a first magnetic layer, and a second magnetic layer. The first coil assembly includes a first substrate and two first electrically conductive circuits respectively arranged on two surfaces of the first substrate that are opposite to each other. The first magnetic layer and the second magnetic layer are respectively arranged on the two surfaces of the first substrate that are opposite to each other, and the two first electrically conductive circuits are respectively embedded in the first magnetic layer and the second magnetic layer. The first substrate has a first non-circuit layout, and the first electrically conductive circuit is arranged around the first non-circuit layout. A ratio between an area of the first non-circuit layout and an area of the first substrate is 0.1 or more.

18 Claims, 8 Drawing Sheets

THIN FILM INDUCTOR

CROSS-REFERENCE TO RELATED PATENT APPLICATION

This application claims the benefit of priority to Taiwan Patent Application No. 110121806, filed on Jun. 16, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a passive component, and more particularly to a thin film inductor.

BACKGROUND OF THE DISCLOSURE

Thin film inductors are indispensable passive components in electronic products. Conventional thin film inductors include magnetic materials and coil assemblies embedded in the magnetic materials. Furthermore, the coil assembly includes a board and a spiral coil disposed on the board, and a part of the magnetic material is arranged at a central part surrounded by the spiral coil. When an electric current passes through the spiral coil, a magnetic flux change occurs at in the central part surrounded by the spiral coil, such that the coil assembly that includes the spiral coil generates an induction current.

As a size of electronic products becomes smaller, a size of the thin film inductor also becomes smaller. In order to increase an inductance value of the thin film inductor without increasing the size thereof, a number of turns of the spiral coil of the thin film inductor are usually increased. However, when the spiral coil has more turns, a smaller distance is defined between two turns of the spiral coil that are adjacent to each other, thereby resulting in a higher level of manufacturing difficulty. In addition, although increasing the number of turns of the spiral coil can increase the inductance value of the thin film inductor, a saturation current thereof is reduced. Therefore, flexibly adjusting a property of the thin film inductor according to practical requirements can be difficult.

SUMMARY OF THE DISCLOSURE

In response to the above-referenced technical inadequacies, the present disclosure provides a thin film inductor, for which the difficulty of manufacturing an electrically conductive circuit of the thin film inductor can be reduced through an improvement in structural design, and a property of the thin film inductor can be adjusted according to practical requirements.

In one aspect, the present disclosure provides a thin film inductor, which includes a first coil assembly, a first magnetic layer, and a second magnetic layer. The first coil assembly includes a first substrate and two first electrically conductive circuits respectively arranged on two surfaces of the first substrate that are opposite to each other. The first magnetic layer and the second magnetic layer are respectively arranged on the two surfaces of the first substrate that are opposite to each other, and the two first electrically conductive circuits are respectively embedded in the first magnetic layer and the second magnetic layer. The first substrate has a first non-circuit layout, and the first electrically conductive circuit is arranged around the first non-circuit layout. A ratio between an area of the first non-circuit layout and an area of the first substrate is 0.1 or more.

Therefore, one of the beneficial effects of the present disclosure is that, in the thin film inductor provided by the present disclosure, by virtue of "the first substrate having the first non-circuit layout, the first electrically conductive circuit being arranged around the first non-circuit layout, and the ratio between the area of the first non-circuit layout and the area of the first substrate being 0.1 or more," the difficulty of manufacturing the electrically conductive circuit of the thin film inductor can be reduced, and the property of the thin film inductor can be adjusted according to practical requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
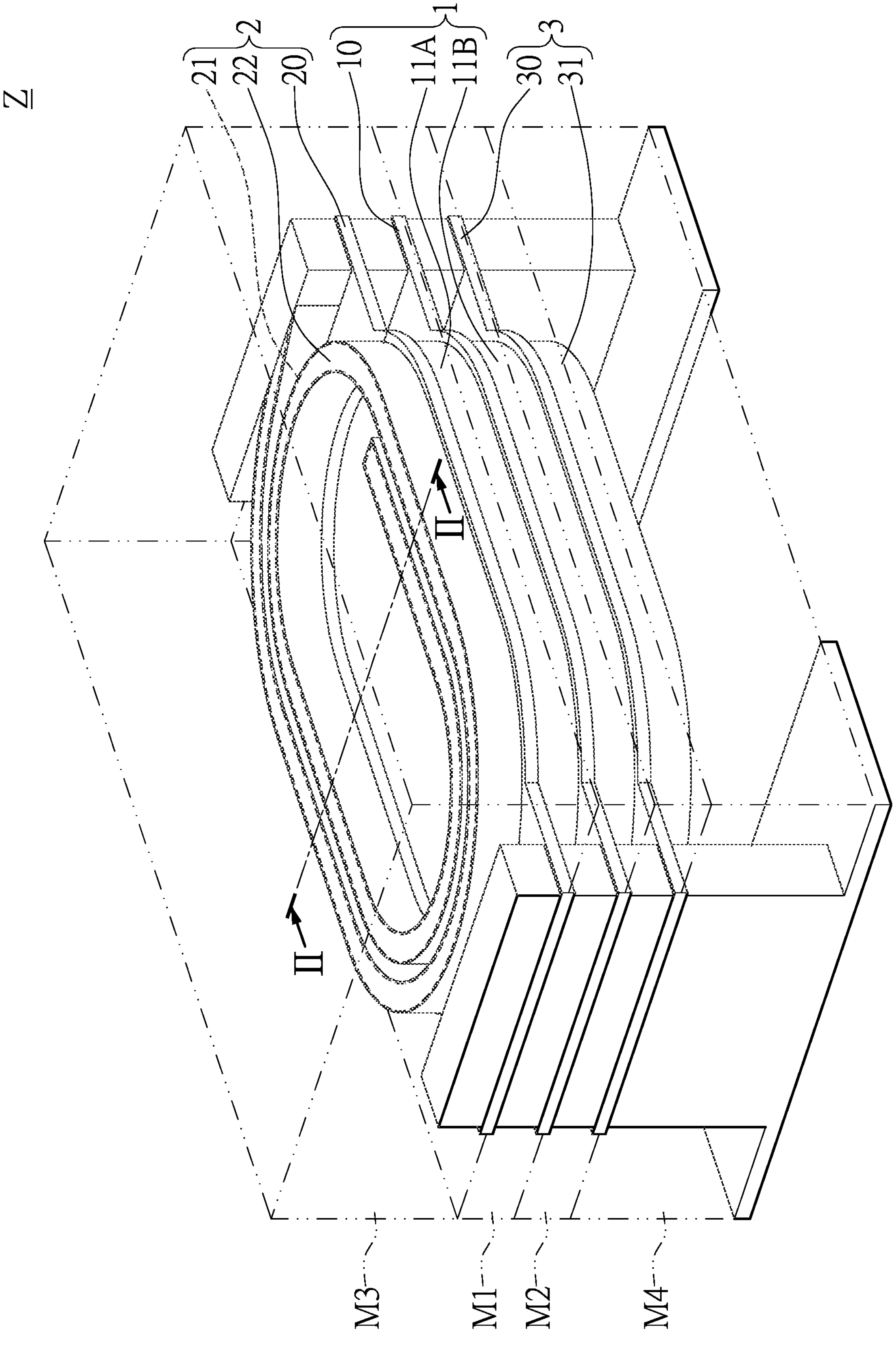
FIG. 1 is a schematic perspective view of a thin film inductor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
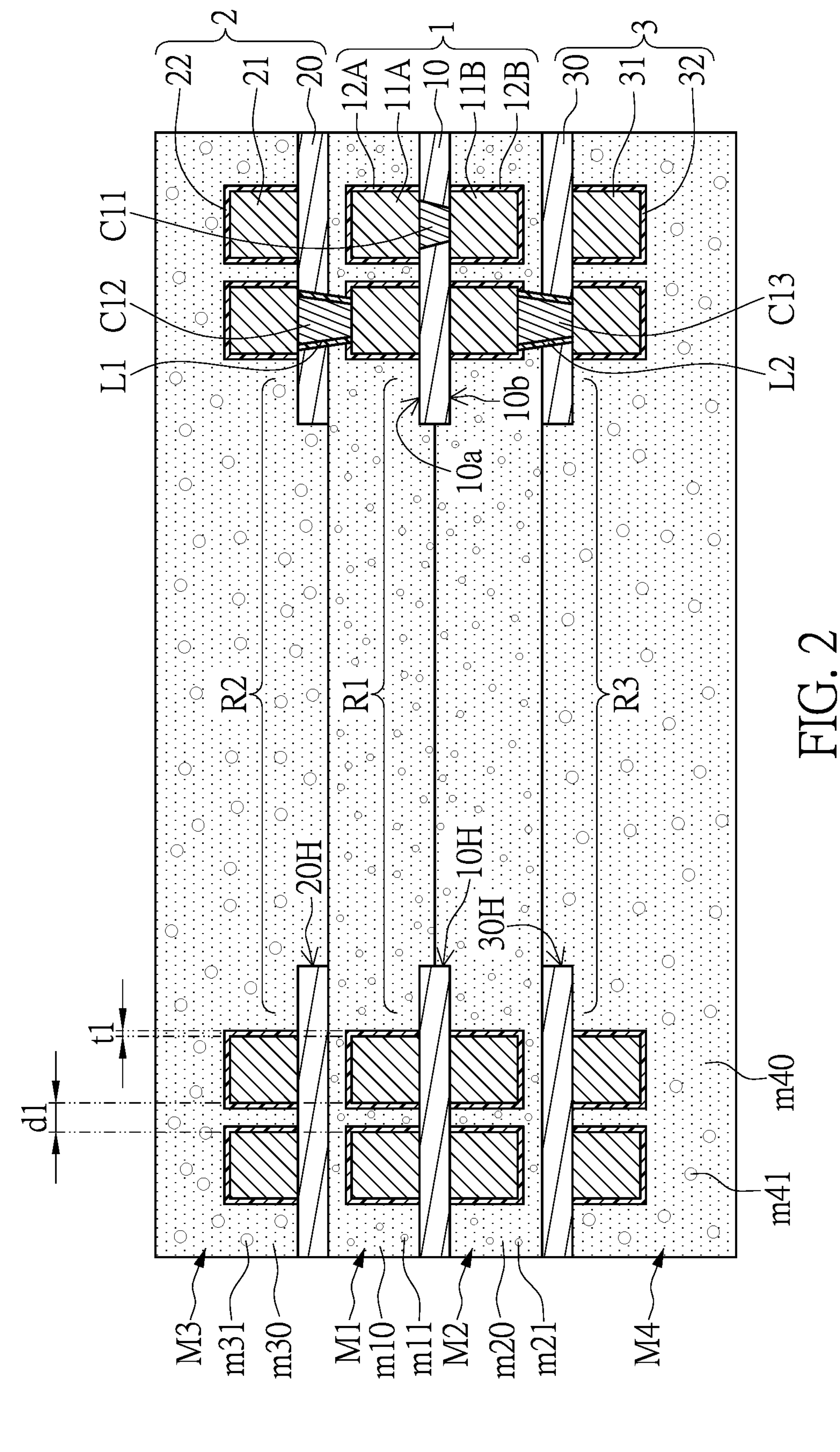
FIG. 2 is a cross-sectional view taken along line II-II of FIG. 1.

Referring to FIG. 1 and FIG. 2, a first embodiment of the present disclosure provides a thin film inductor Z, which includes a first coil assembly 1, a first magnetic layer M1, and a second magnetic layer M2.

As shown in FIG. 2, the first coil assembly 1 includes a first substrate 10 and two first electrically conductive circuits 11A and 11B. The first substrate 10 can be a composite substrate, such as a flame retardant 4 (FR4) board, a flame retardant 5 (FR5) board, a glass fiber unclad laminate, an epoxy glass fiber unclad laminate, a polyimide board, and an epoxy magnetic material laminate.

The first substrate 10 has two surfaces 10*a* and 10*b* that are opposite to each other, and a first non-circuit layout R1 and a first circuit layout that surrounds the first non-circuit layout R1 are correspondingly defined on each of the two surfaces 10*a* and 10*b*. That is to say, the first non-circuit layout R1 is arranged approximately at a central region of the first substrate 10, and the first circuit layout is arranged at a peripheral region of the first substrate 10.

The two first electrically conductive circuits 11A and 11B are respectively arranged on the two surfaces 10*a* and 10*b* of the first substrate 10 that are opposite to each other. Each of the two first electrically conductive circuits 11A and 11B is a conductor and has a predetermined circuit pattern, but the present disclosure is not limited thereto. The two first electrically conductive circuits 11A and 11B are respectively located in the first circuit layouts of the two surfaces 10*a* and 10*b*, and each of the two first electrically conductive circuits 11A and 11B is arranged around the first non-circuit layout R1. More specifically, each of the two first electrically conductive circuits 11A and 11B is a spiral circuit having a predetermined number of turns. In one embodiment, a number of turns of each of the two first electrically conductive circuits 11A and 11B are 4 or less, and preferably 3 or less. In one embodiment as shown in FIG. 1 and FIG. 2, the number of turns of each of the two first electrically conductive circuits 11A and 11B are 2, but the present disclosure is not limited thereto. In one embodiment, a distance d1 between two adjacent turns of circuit of the first electrically conductive circuit 11A or 11B is at least 15 μm, and preferably 20 μm to 35 μm, but the present disclosure is not limited thereto.

In contrast, the first non-circuit layout R1 does not have electrically conductive circuits arranged therein. In the present embodiment, a ratio between an area of the first non-circuit layout R1 and an area of any one of the two surfaces 10*a* and 10*b* of the first substrate 10 is not less than (i.e., greater than or equal to) 0.1. In an exemplary embodiment, the ratio between the area of the first non-circuit layout R1 and the area of any one of the two surfaces 10*a* and 10*b* of the first substrate 10 is greater than 0.15, preferably greater than 0.2, and more preferably greater than 0.3.

Referring to FIG. 2, in the present embodiment, the first coil assembly 1 further includes a first electrically conductive column C11. The first electrically conductive column C11 passes through the first substrate 10, so that the two first electrically conductive circuits 11A and 11B that are located on two opposite sides of the first substrate 10 are electrically connected to each other. Further, the first electrically conductive column C11 extends from the surface 10*a* of the first substrate 10 to the surface 10*b* of the first substrate 10. In addition, in the present embodiment, the first electrically conductive column C11 is correspondingly connected to two outmost turns of the two first electrically conductive circuits 11A and 11B, but the present disclosure is not limited thereto. That is to say, a position of the first electrically conductive column C11 changes according to a number of the electrically conductive circuits of the thin film inductor Z. In another embodiment, the first electrically conductive column C11 can be correspondingly connected to two innermost turns of the two first electrically conductive circuits 11A and 11B.

Furthermore, in the present embodiment, the first coil assembly 1 further includes two first electrically insulating layers 12A and 12B, and the two first electrically insulating layers 12A and 12B respectively cover the two first electrically conductive circuits 11A and 11B. In this way, the two first electrically conductive circuits 11A and 11B can be respectively and electrically insulated from the first magnetic layer M1 and the second magnetic layer M2 through the two first electrically insulating layers 12A and 12B, so as to avoid a short circuit caused by the two first electrically conductive circuits 11A and 11B respectively contacting the first magnetic layer M1 and the second magnetic layer M2. For example, the two first electrically insulating layers 12A and 12B can be formed by atomic layer deposition, molecular layer deposition, chemical vapor deposition or an immersion process. Each of the two first electrically insulating layers 12A and 12B can be made of an organic material, an inorganic material or an organic-inorganic material, and can have a thickness from 0.1 nm to 20 μm, but the present disclosure is not limited thereto.

It is worth mentioning that, in the present embodiment, the two first electrically insulating layers 12A and 12B respectively do not completely fill two gaps between two adjacent turns of circuit of the two first electrically conductive circuits 11A and 11B. Accordingly, a thickness t1 of the first electrically insulating layer 12A or 12B is less than the distance d1 between any two adjacent turns of circuit of the first electrically conductive circuit 11A or 11B. Further, the distance d1 between any two adjacent turns of circuit of the first electrically conductive circuit 11A or 11B is preferably greater than twice the thickness t1 of the first electrically insulating layer 12A or 12B. That is, the following relationship is satisfied: $d1>2t1$. In this way, one part of the first magnetic layer M1 can be filled into the gap defined by the two adjacent turns of circuit of the first electrically conductive circuit 11A, and one part of the second magnetic layer M2 can be filled into the gap defined by the two adjacent turns of circuit of the second electrically conductive circuit 11B.

In one embodiment, the distance d1 is greater than 3 times the thickness t1 of the first electrically insulating layer 12A or 12B. Moreover, the distance d1 can be greater than 4 times the thickness t1 of the first electrically insulating layer 12A or 12B. That is to say, the thickness t1 of the first electrically insulating layer 12A or 12B can be adjusted based on a size of the distance d1, and can be from 0.1 nm to 10 μm. For example, given that the distance d1 is 20 μm, the thickness t1 of the first electrically insulating layer 12A or 12B is less than 10 μm, and preferably less than 3 μm. In one embodiment, the thickness of the first electrically insulating layer 12A or 12B can be from 0.1 μm to 3 μm, so that an electrically insulating property can be maintained, and the thin film inductor Z can have a better inductivity.

Referring to FIG. 2, the first magnetic layer M1 and the second magnetic layer M2 are respectively arranged on the two surfaces 10*a* and 10*b* of the first substrate 10 that are opposite to each other, and the two first electrically conductive circuits 11A and 11B are respectively embedded in the first magnetic layer M1 and the second magnetic layer M2. As described above, one part of the first magnetic layer M1 is filled into the gap defined by the two adjacent turns of circuit of the first electrically conductive circuit 11A, and one part of the second magnetic layer M2 is filled into the gap defined by the two adjacent turns of circuit of the second electrically conductive circuit 11B.

In one embodiment, the first magnetic layer M1 and the second magnetic layer M2 have the same magnetic permeability. However, in another embodiment, the first magnetic layer M1 and the second magnetic layer M2 can have different magnetic permeability according to practical requirements. Moreover, the magnetic permeability of the first magnetic layer M1 and the magnetic permeability of the second magnetic layer M2 can be adjusted through adjusting a composition, a particle size, and a density of each of the first magnetic layer M1 and the second magnetic layer M2.

For example, the first magnetic layer M1 can include a first filler m10 and a plurality of first particles m11 that are dispersed in the first filler m10, and the second magnetic layer M2 can include a second filler m20 and a plurality of second particles m21 that are dispersed in the second filler m20. The magnetic permeability of the first magnetic layer M1 and the magnetic permeability of the second magnetic layer M2 can be adjusted through a selection of materials of the first filler m10, the second filler m20, the first particle m11, and the second particle m21.

Each of the first filler m10 and the second filler m20 is an electrically insulating material, which can be a thermosetting polymer or a light-activated curing polymer (for example, but not limited to, epoxy or a corresponding UV adhesive). In addition, the first particle m11 and the second particle m21 are both magnetic material powders, such as Si—Fe alloy, Fe—Si—Cr alloy, Fe—Si—Al alloy, iron powder, a ferrite material, an amorphous material, a nanocrystalline material, or any combination thereof with different composition, and/or particle size, and/or hardness. However, the present disclosure is not limited thereto.

In addition, in the present embodiment, the particle size of the particle (i.e., the first particle m11 or the second particle m21) of the magnetic layer (i.e., the first magnetic layer M1 or the second magnetic layer M2) also affects the magnetic permeability of the magnetic layer. More specifically, the smaller the particle size of the particle of the magnetic layer is, the lower the magnetic permeability of the magnetic layer becomes. Therefore, the magnetic permeability of the first magnetic layer M1 and the magnetic permeability of the second magnetic layer M2 can also be adjusted respectively through adjusting the particle size of the first particle m11 of the first magnetic layer M1 and the particle size of the second particle m21 of the second magnetic layer M2.

In this way, the first particle m11 of the first magnetic layer M1 and the second particle m21 of the second magnetic layer M2 each can have a smaller particle size, so as to enhance saturation current of the thin film inductor Z. In an exemplary embodiment, the particle size of the first particle m11 is small enough to be arranged in the gap between the two adjacent turns of circuit of the first electrically conductive circuit 11A. Similarly, the particle size of the second particle m21 is small enough to be arranged in the gap between the two adjacent turns of circuit of the first electrically conductive circuit 11B. Accordingly, the inductivity of the thin film inductor Z can be improved. Furthermore, given that the particle size of the first particle m11 or the second particle m21 is r, the particle size r, the distance d1, and the thickness t1 of the first electrically insulating layer 12A or 12B satisfy the following relation: $r<(d1-2t1)$. Therefore, the particle size of the first particle m11 and the particle size of the second particle m21 can be determined according to the distance d1 and the thickness t1 of the first electrically insulating layer 12A or 12B. For example, the particle size of the first particle m11 can be between 0.5 μm and 15 μm, and the particle size of the second particle m21 can be between 0.5 μm and 15 μm, but the present disclosure is not limited thereto. Preferably, the particle size of the first particle m11 can be between 1 μm and 5 μm, and the particle size of the second particle m21 can be between 5 μm and 15 μm, but the present disclosure is not limited thereto.

In addition, since the two first electrically conductive circuits 11A and 11B are respectively embedded in the first magnetic layer M1 and the second magnetic layer M2, the first particle m11 with a smaller particle size and the second particle m21 with a smaller particle size can also be used to avoid damaging structures of the two first electrically conductive circuits 11A and 11B, respectively. Further, in one embodiment, the first coil assembly 1 can be correspondingly embedded in the first magnetic layer M1 and the second magnetic layer M2 by a pressing process during steps of manufacturing the thin film inductor Z. Accordingly, the particle size of the first particle m11 is less than the distance d1 between the two adjacent turns of circuit of the first electrically conductive circuit 11A, and the particle size of the second particle m21 is less than the distance d1 between the two adjacent turns of circuit of the second electrically conductive circuit 11B, so as to prevent the first particle m11 of the first magnetic layer M1 and the second particle m21 of the second magnetic layer M2 from damaging the two first electrically conductive circuits 11A and 11B during the pressing process.

On the other hand, since the magnetic layer with a higher density usually has a higher magnetic permeability, the magnetic permeability of the first magnetic layer M1 and the magnetic permeability of the second magnetic layer M2 can be adjusted respectively through adjusting a density of the first magnetic layer M1 and a density of the second magnetic layer M2.

It should be noted that, in a conventional thin film inductor, a number of turns of an electrically conductive circuit in an assembly are increased to more than 5, so as to increase inductivity. However, a saturation current of the conventional thin film inductor can be reduced. In contrast, in the thin film inductor Z of the present disclosure, the number of turns of the electrically conductive circuit in the coil assembly is reduced to increase the area of the first non-circuit layout R1, so that the thin film inductor Z has a relatively high saturation current.

In the present embodiment, the first substrate 10 further has a first through hole 10H that is arranged in the first non-circuit layout R1. Another part of the first magnetic layer M1 and another part of the second magnetic layer M2 are jointly embedded in the first through hole 10H, so as to enhance the inductivity of the thin film inductor Z. Accordingly, although the number of turns of the two first electrically conductive circuits 11A and 11B of the present disclosure are reduced, the thin film inductor Z can still have a specific inductance value through filling the another part of the first magnetic layer M1 and the another part of the second magnetic layer M2 into the first through hole 10H.

It should be noted that, compared to the conventional thin film inductor, the saturation current can be increased by increasing the area of the first non-circuit layout R1 in the thin film inductor Z of the embodiments of the present disclosure. In order to increase the inductance value while maintaining the saturation current at a specific value, the thin film inductor Z of the embodiments of the present disclosure further includes multiple ones of the coil assemblies. Further, as shown in FIG. 2, the thin film inductor Z of the present embodiment further includes a second coil assembly 2, a third magnetic layer M3, a third coil assembly 3, and a fourth magnetic layer M4. The second coil assembly 2 and the third coil assembly 3 are respectively located on two opposite sides of the first coil assembly 1. In the present embodiment, the third coil assembly 3 and the second coil assembly 2 are approximately symmetrical with respect to the first substrate 10, but the present disclosure is not limited thereto.

As shown in FIG. 2, the second coil assembly 2 is arranged on one side of the first coil assembly 1, and includes a second substrate 20 and a second electrically conductive circuit 21. The third coil assembly 3 is arranged on another side of the first coil assembly 1, and includes a third substrate 30 and the third electrically conductive circuit 31.

In the present embodiment, the second coil assembly 2 and the third coil assembly 3 are respectively arranged on the first magnetic layer M1 and the second magnetic layer M2. More specifically, the first magnetic layer M1 is arranged between the second substrate 20 and the first coil assembly 1, and the second magnetic layer M2 is arranged between the third substrate 30 and the first coil assembly 1. In addition, the second electrically conductive circuit 21 and the first magnetic layer M1 are respectively arranged on two sides of the second substrate 20 that are opposite to each other. The third electrically conductive circuit 31 and the second magnetic layer M2 are respectively arranged on two sides of the third substrate 30 that are opposite to each other.

The second substrate 20 includes a second circuit layout and a second non-circuit layout R2, and the second circuit layout surrounds the second non-circuit layout R2. Similarly, the third substrate 30 includes a third circuit layout and a third non-circuit layout R3, and the third circuit layout surrounds the third non-circuit layout R3. As shown in FIG. 2, both projections of the second non-circuit layout R2 and the third non-circuit layout R3 overlap with the first non-circuit layout R1 in a vertical direction.

In addition, a ratio between an area of the second non-circuit layout R2 and the second substrate 20 is 0.1 or more, preferably greater than 0.15, and more preferably greater than 0.2. Similarly, a ratio between an area of the third non-circuit layout R3 and an area of the third substrate 30 is 0.1 or more. In an exemplary embodiment, the ratio between the area of the third non-circuit layout R3 and the area of the third substrate 30 is greater than 0.15, preferably greater than 0.2, and more preferably greater than 0.3.

As described above, the larger the area of the non-circuit layout (e.g., the first to the third non-circuit layouts R1 to R3) is, the higher the saturation current of the thin film inductor Z is. However, the areas of the first to the third non-circuit layouts R1 to R3 do not have to be exactly the same, but can be adjusted according to practical requirements. In one embodiment, the area of the second non-circuit layout R2 is different from the area of the first non-circuit layout R1. Furthermore, the ratio between the area of the second non-circuit layout R2 and that of the second substrate 20 is different from the ratio between the area of the first non-circuit layout R1 and that of the first substrate 10.

The second electrically conductive circuit 21 is arranged around the second non-circuit layout R2, and the third electrically conductive circuit 31 is arranged around the third non-circuit layout R3. In the present embodiment, each of the second electrically conductive circuit 21 and the third electrically conductive circuit 31 is a conductor and has a predetermined circuit pattern, but the present disclosure is not limited thereto. Specifically, each of the second electrically conductive circuit 21 and the third electrically conductive circuit 31 is a spiral circuit having a predetermined number of turns. In one embodiment, a number of turns of each of the second electrically conductive circuit 21 and the third electrically conductive circuit 31 are 4 or less, and preferably 3 or less. In one embodiment as shown in FIG. 2, the number of turns of each of the second electrically conductive circuit 21 and the third electrically conductive circuit 31 are 2, but the present disclosure is not limited thereto. In addition, the number of turns of each of the two first electrically conductive circuits 11A and 11B, the second electrically conductive circuit 21, and the third electrically conductive circuit 31 do not have to be exactly the same.

It is worth mentioning that, the second electrically conductive circuit 21 is electrically connected in series to the first electrically conductive circuit 11A, and the third electrically conductive circuit 31 is electrically connected in series to the first electrically conductive circuit 11B. Further, in the present embodiment, the thin film inductor Z further includes a second electrically conductive column C12, a third electrically conductive column C13, and two dielectric layers L1 and L2 respectively covering the second electrically conductive column C12 and the third electrically conductive column C13.

As shown in FIG. 2, the second electrically conductive column C12 extends from the second electrically conductive circuit 21 toward the first electrically conductive circuit 11A, and passes through the second substrate 20, the first magnetic layer M1, and the first electrically insulating layer 12A covering the first electrically conductive circuit 11A. It should be noted that, the dielectric layer L1 covers the second electrically conductive column C12, so that the second electrically conductive column C12 is electrically insulated from the first magnetic layer M1. The second electrically conductive column C12 is correspondingly connected to one of the turns of the second electrically conductive circuit 21 and one of the turns of the first electrically conductive circuit 11A. In the present embodiment, the second electrically conductive column C12 is correspondingly connected to an innermost turn of the second electrically conductive circuit 21 and the innermost turn of the first electrically conductive circuit 11A, but the present disclosure is not limited thereto. In another embodiment, the second electrically conductive column C12 is correspondingly connected to an outmost turn of the second electrically conductive circuit 21 and the outmost turn of the first electrically conductive circuit 11A.

Similarly, the third electrically conductive column C13 extends from the third electrically conductive circuit 31 toward the first electrically conductive circuit 11B, and passes through the first electrically insulating layer 12B covering the first electrically conductive circuit 11B, the second magnetic layer M2, and the third substrate 30. The third electrically conductive column C13 is electrically insulated from the second magnetic layer M2 through the dielectric layer L2. The third electrically conductive column C13 is correspondingly connected to one of the turns of the first electrically conductive circuit 11B and one of the turns of the third electrically conductive circuit 31. More specifically, in the present embodiment, the third electrically conductive column C13 is correspondingly connected to an innermost turn of the third electrically conductive circuit 31 and the innermost turn of the first electrically conductive circuit 11B, but the present disclosure is not limited thereto. In another embodiment, the third electrically conductive column C13 is correspondingly connected to an outmost turn of the third electrically conductive circuit 31 and the outmost turn of the first electrically conductive circuit 11B.

It should be noted that, in the embodiment as shown in FIG. 2, a position of the second electrically conductive column C12 and a position of the third electrically conductive column C13 is approximately aligned with each other in the vertical direction. However, in another embodiment, the position of the second electrically conductive column C12 and the position of the third electrically conductive column C13 do not have to be aligned with each other, but can be in a staggered arrangement. For example, from a top view of the thin film inductor Z, the position of the first electrically conductive column C11, the position of the second electrically conductive column C12, and the position of the third electrically conductive column C13 can be correspondingly arranged on different sides of a central part of the thin film inductor Z. That is to say, the position of the first electrically conductive column C11, the position of the second electrically conductive column C12, and the position of the third electrically conductive column C13 are not limited as long as each of the electrically conductive circuits (i.e., the two first electrically conductive circuits 11A and 11B, the second electrically conductive circuit 21, and the third electrically conductive circuit 31) can be connected in series to each other.

In the embodiments of the present disclosure, through an arrangement of multiple ones of the first coil assembly 1 that are stacked to each other, multiple ones of the second coil assembly 2 that are stacked to each other, and multiple ones of the third coil assembly 3 that are stacked to each other, the number of turns of each of the first electrically conductive circuits 11A or 11B, the second electrically conductive circuit 21, and the third electrically conductive circuit 31 can be reduced, and the areas occupied by the first to the third non-circuit layouts R1 to R3 can be enlarged. In this way, compared to the conventional thin film inductor, the thin film inductor Z of the present disclosure can have a higher saturation current and still maintain a certain inductance value.

In addition, the second coil assembly 2 of the present embodiment includes a second electrically insulating layer 22, and the second electrically insulating layer 22 covers the second electrically conductive circuit 21, so that the second electrically conductive circuit 21 is electrically insulated from the third magnetic layer M3. In addition, the third coil assembly 3 includes a third electrically insulating layer 32, and the third electrically insulating layer 32 covers the third electrically conductive circuit 31, so that the third electrically conductive circuit 31 is electrically insulated from the fourth magnetic layer M4. Similar to the first electrically conductive circuit 11A or 11B, a distance between any two turns of circuit of the second electrically conductive circuit 21 is greater than a thickness of the second electrically insulating layer 22, and a distance between any two turns of circuit of the third electrically conductive circuit 31 is greater than a thickness of the third electrically insulating layer 32. It should be noted that, the distance between any two turns of circuit of the second electrically conductive circuit 21 and the distance between any two turns of circuit of the third electrically conductive circuit 31 can be different from the distance d1 between any two turns of circuit of the first electrically conductive circuit 11A or 11B.

Each of the second electrically insulating layer 22 and the third electrically insulating layer 32 can also be formed by the atomic layer deposition, the molecular layer deposition, chemical vapor deposition or the immersion process. In an exemplary embodiment, the second electrically insulating layer 22 and the third electrically insulating layer 32 can be respectively formed on the second electrically conductive circuit 21 and the third electrically conductive circuit 31 by the molecular layer deposition. Each of the second electrically insulating layer 22 and the third electrically insulating layer 32 can be made of the organic material, the inorganic material or the organic-inorganic material, and can have a thickness from 0.1 nm to 20 μm, but the present disclosure is not limited thereto.

The third magnetic layer M3 is arranged on the second substrate 20, and the second electrically conductive circuit 21 is embedded in the third magnetic layer M3, so that a part of the third magnetic layer M3 is filled into a gap defined by the second electrically conductive circuit 21. It should be noted that, the second substrate 20 of the second coil assembly 2 of the embodiments of the present disclosure has a second through hole 20H. The second through hole 20H is arranged in the second non-circuit layout R2, and a projection of an area of the second through hole 20H at least partially overlaps with a projection of an area of the first through hole 10H of the first substrate 10 in the vertical direction. Accordingly, the third magnetic layer M3 is filled into the second through hole 20H and is directly connected to the first magnetic layer M1.

Similarly, the fourth magnetic layer M4 is arranged on the third substrate 30, and the third electrically conductive circuit 31 is embedded in the fourth magnetic layer M4, so that a part of the fourth magnetic layer M4 is filled into a gap defined by any two turns of circuit of the third electrically conductive circuit 31. In addition, the third substrate 30 of the third coil assembly 3 of the embodiments of the present disclosure has a third through hole 30H. The third through hole 30H is arranged in the third non-circuit layout R3, and a projection of an area of the third through hole 30H overlaps with the projection of the area of the first through hole 10H of the first substrate 10 in the vertical direction. Accordingly, the fourth magnetic layer M4 is filled into the third through hole 30H, and is directly connected to the second magnetic layer M2.

That is to say, as shown in FIG. 2, a central part of the thin film inductor Z of the present embodiment is formed by stacking of multiple ones of the magnetic layer (i.e., the first to the fourth magnetic layers M1 to M4). Therefore, the magnetic permeability of the first magnetic layer M1, the magnetic permeability of the second magnetic layer M2, magnetic permeability of the third magnetic layer M3, and magnetic permeability of the fourth magnetic layer M4 have a greater influence on the inductance value of the thin film inductor Z. Accordingly, a property of the thin film inductor Z can be adjusted through adjusting the magnetic permeability of each of the first magnetic layer M1, the second magnetic layer M2, the third magnetic layer M3, and the fourth magnetic layer M4.

In the embodiments of the present disclosure, the magnetic permeability of each of the first magnetic layer M1, the second magnetic layer M2, the third magnetic layer M3, and the fourth magnetic layer M4 do not have to be the same. In one embodiment, the magnetic permeability of the first magnetic layer M1 is the same as the magnetic permeability of the second magnetic layer M2, and the magnetic permeability of the third magnetic layer M3 is greater than the magnetic permeability of the first magnetic layer M1, but the present disclosure is not limited thereto.

Further, the magnetic permeability can be adjusted by adjusting different composition, different particles size, and different hardness particles of each of the first magnetic layer M1, the second magnetic layer M2, the third magnetic layer M3, and the fourth magnetic layer M4. For example, the third magnetic layer M3 can include a third filler m30 and a plurality of third particles m31 that are dispersed in the third filler m30, and the fourth magnetic layer M4 can include a fourth filler m40 and a plurality of fourth particles m41 that are dispersed in the fourth filler m40. Each of the third filler m30 and the fourth filler m40 is the electrically insulating material, which can be the thermosetting polymer or the light-activated curing polymer, and the third particle m31 and the fourth particle m41 are both magnetic material powders. Regarding the materials of the third filler m30 and the fourth filler m40, reference can be made to the materials of the first filler m10 and the second filler 20 as described above. As for the materials of the third particle m31 and the fourth particle m41, reference can be made to the materials of the first particle m11 and the second particle m21 as described above. A detailed description thereof will not be repeated herein.

The smaller the particle size of the particle of the magnetic layer is, the lower the magnetic permeability of the magnetic layer becomes. Therefore, the magnetic permeability of the third magnetic layer M3 and the magnetic permeability of the fourth magnetic layer M4 can be adjusted respectively through adjusting a particle size of the third particle m31 and a particle size of the fourth particle m41. In one embodiment, the particle size of the first particle m11 is less than the particle size of the third particle m31, so that the magnetic permeability of the first magnetic layer M1 is less than the magnetic permeability of the third magnetic layer M3. The particle size of the second particle m21 is less than the particle size of the fourth particle m41, so that the magnetic permeability of the second magnetic layer M2 is less than the magnetic permeability of the fourth magnetic layer M4. The saturation current of the thin film inductor Z can be increased through allowing each of the first magnetic layer M1 and the second magnetic layer M2 to have a lower magnetic permeability, and the inductance value of the thin film inductor Z can be increased through allowing each of the third magnetic layer M3 and the fourth magnetic layer M4 to have a higher magnetic permeability, but the present disclosure is not limited thereto. In one embodiment, the third particle m31 of the third magnetic layer M3 can be filled into the gap defined by any two adjacent turns of circuit of the second electrically conductive circuit 21, and the fourth particle m41 can be filled into the gap defined by any two adjacent turns of circuit of the third electrically conductive circuit 31.

Based on the above, in addition to improving a structural design of the thin film inductor Z, the property of the thin film inductor Z in the present disclosure can also be adjusted through adjusting the magnetic permeability of each of the first magnetic layer M1, the second magnetic layer M2, the third magnetic layer M3, and the fourth magnetic layer M4.

Second Embodiment

Figure 3:
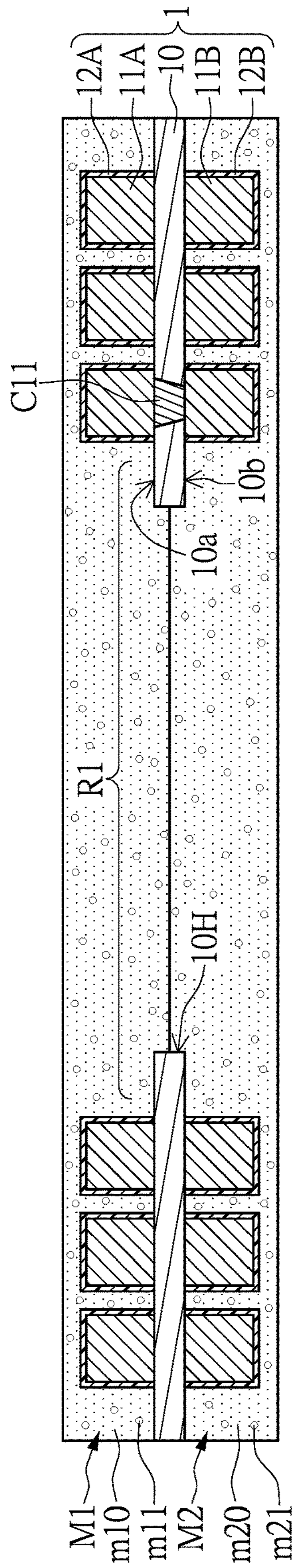
FIG. 3 is a schematic cross-sectional view of a thin film inductor according to a second embodiment of the present disclosure.

Referring to FIG. 3, FIG. 3 is a schematic cross-sectional view of a thin film inductor according to a second embodiment of the present disclosure. In the present embodiment, components of the thin film inductor that are the same as those of the thin film inductor of the first embodiment have the same reference numerals, and the same components will not be reiterated herein. The thin film inductor Z of the present embodiment includes only the first coil assembly 1, and the second coil assembly 2 and the third coil assembly 3 are omitted. Compared to the first embodiment, since the thin film inductor Z of the present embodiment includes only the first coil assembly 1, the number of turns of each of the two first electrically conductive circuits 11A and 11B are greater (e.g., the number of turns are three as exemplarily shown in FIG. 3). However, the number of turns of each of the two first electrically conductive circuits 11A and 11B are 4 or less, and the ratio between the area of the first non-circuit layout R1 and the area of the first substrate 10 is at least greater than 0.1. In this way, the thin film inductor Z of the present embodiment can have higher saturation current than the conventional thin film inductors.

In addition, in the thin film inductor Z of the present embodiment, the first electrically conductive column C11 is correspondingly connected to the innermost turns of the two first electrically conductive circuits 11A and 11B, so that the two first electrically conductive circuits 11A and 11B are connected in series to each other, but the present disclosure is not limited thereto.

Third Embodiment

Figure 4:
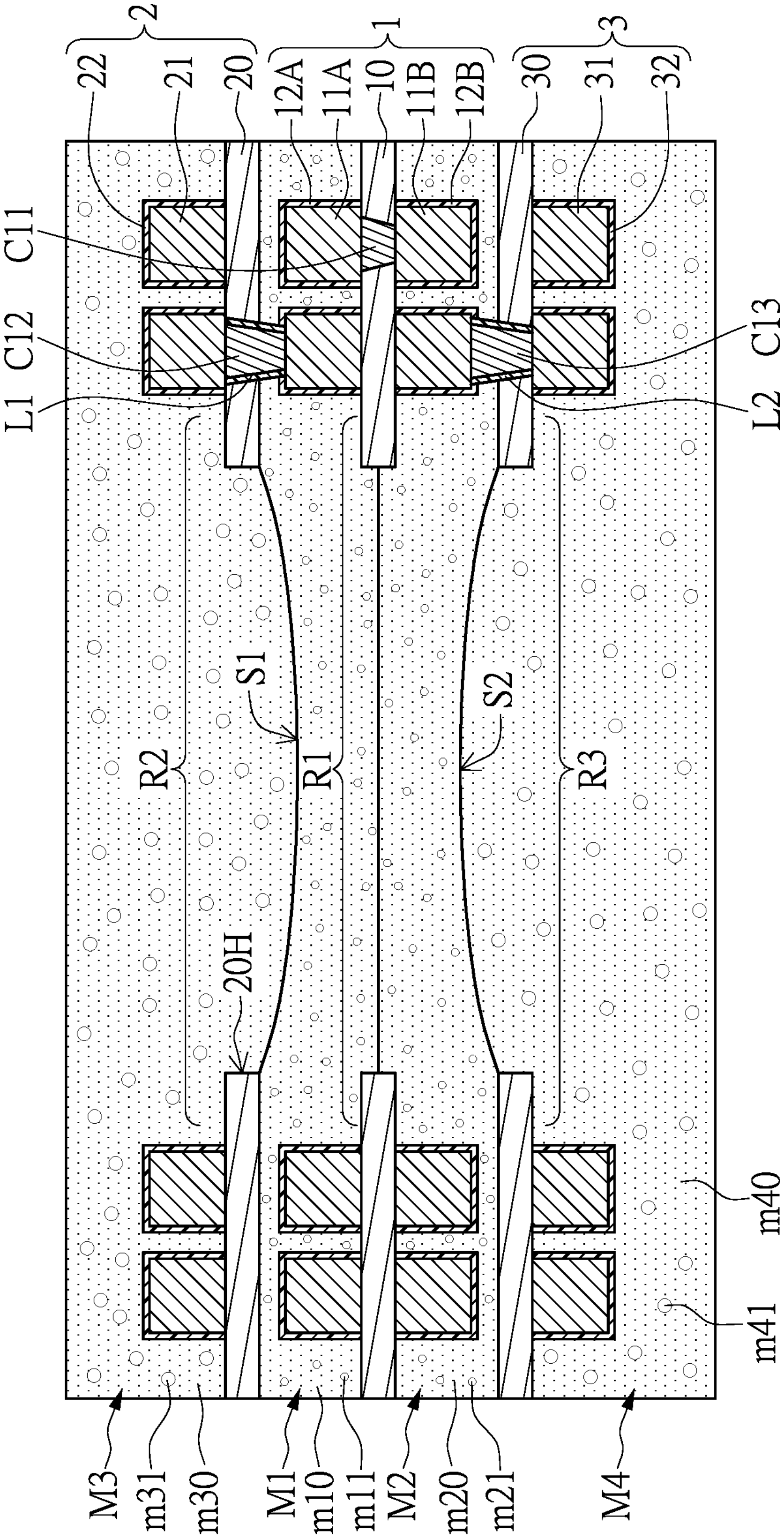
FIG. 4 is a schematic cross-sectional view of a thin film inductor according to a third embodiment of the present disclosure.

Referring to FIG. 4, FIG. 4 is a schematic cross-sectional view of a thin film inductor according to a third embodiment of the present disclosure. In the present embodiment, components of the thin film inductor that are the same as those of the thin film inductor of the first embodiment have the same reference numerals, and the same components will not be reiterated herein. In the present embodiment, the first magnetic layer M1 has a first central part arranged in the first non-circuit layout R1, and the first central part has a first recessed surface S1. In addition, the second magnetic layer M2 has a second central part arranged in the first non-circuit layout R1, and the second central part has a second recessed surface S2. As shown in FIG. 4, both the first recessed surface S1 and the second recessed surface S2 are recessed toward the first substrate 10, and a projection of the first recessed surface S1 and a projection of the second recessed surface S2 overlap in the vertical direction.

That is to say, two recesses are respectively defined by the first recessed surface S1 of the first magnetic layer M1 and the second recessed surface S2 of the second magnetic layer M2. In addition, a central part of the third magnetic layer M3 is filled into the recess defined by the first recessed surface S1. Similarly, a central part of the fourth magnetic layer M4 is filled into the recess defined by the second recessed surface S2.

In the first embodiment, when the magnetic permeability of the first magnetic layer M1 is less than the magnetic permeability of the third magnetic layer M3, and the magnetic permeability of the second magnetic layer M2 is less than magnetic permeability of the fourth magnetic layer M4, the thin film inductor Z can have a higher saturation current, but the inductance value of the thin film inductor Z can be decreased. Therefore, in the third embodiment, through each of the first magnetic layer M1 and the second magnetic layer M2 having the recess, and the central parts of the third magnetic layer M3 and the fourth magnetic layer M4 that have a higher magnetic permeability being respectively filled into the two recesses of the first magnetic layer M1 and the second magnetic layer M2, the inductance value of the thin film inductor Z can be increased and the property of the thin film inductor Z can be optimized without excessively sacrificing or reducing the saturation current of the thin film inductor Z.

Fourth Embodiment

Figure 5:
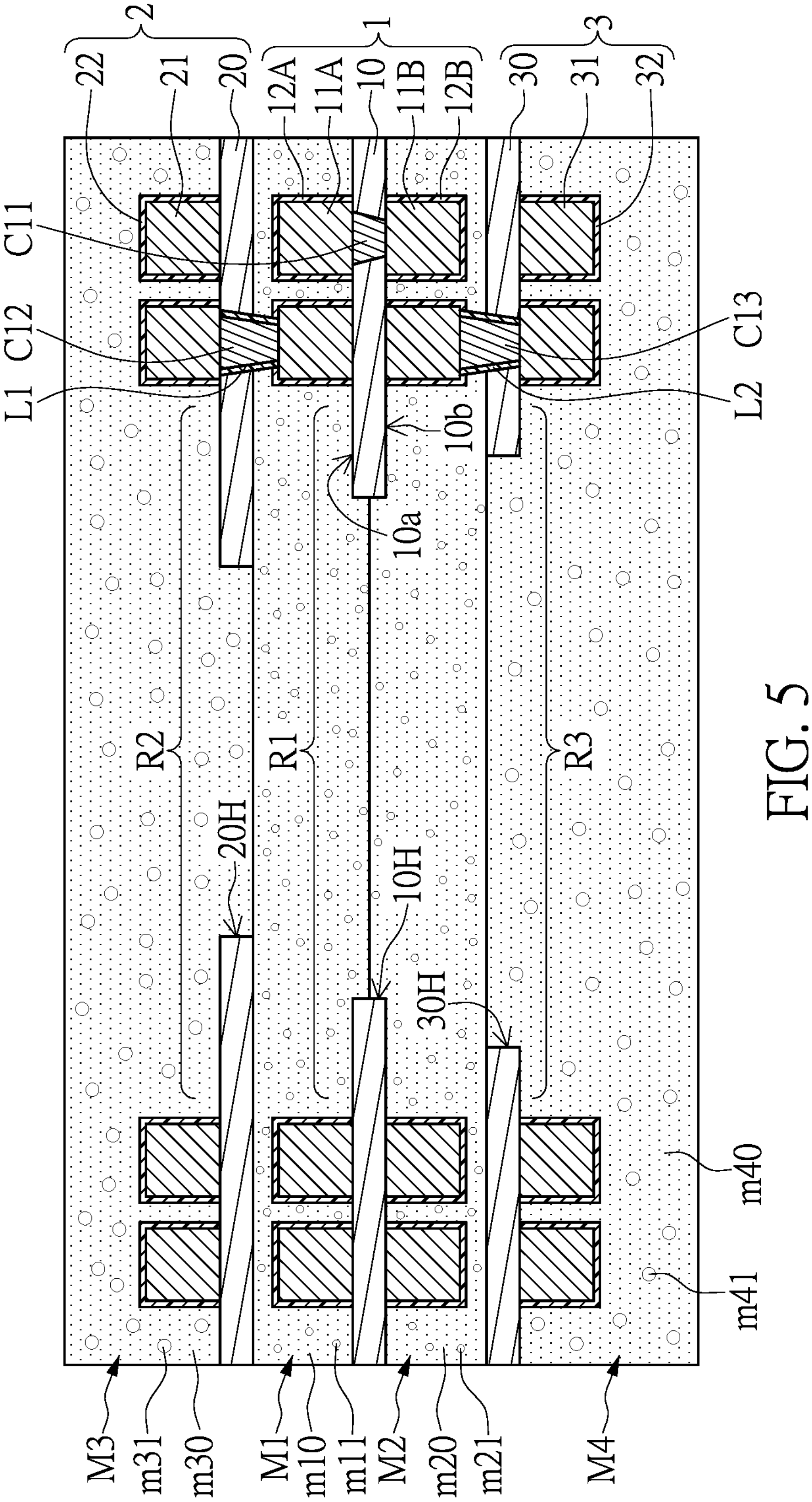
FIG. 5 is a schematic cross-sectional view of a thin film inductor according to a fourth embodiment of the present disclosure.

Referring to FIG. 5, FIG. 5 is a schematic cross-sectional view of a thin film inductor according to a fourth embodiment of the present disclosure. In the present embodiment, components of the thin film inductor that are the same as those of the thin film inductor of the first embodiment have the same reference numerals, and the same components will not be reiterated herein. In the present embodiment, the first through hole 10H, the second through hole 20H, and the third through hole 30 have different hole diameters. The hole diameter of the first through hole 10H is greater than the hole diameter of the second through hole, and the hole diameter of the third through hole 30H is greater than the hole diameter of the first through hole 10H, but the present disclosure is not limited thereto.

The hole diameters of the first through hole 10H, the second through hole 20H, and the third through hole 30H can be adjusted according to practical requirements. By taking the first coil assembly 1 as an example, the greater the hole diameter of the first through hole 10H is, the higher the inductance value of the thin film inductor Z becomes. Conversely, the smaller the hole diameter of the first through hole 10H is, the lower the inductance value of the thin film inductor Z becomes. Therefore, the inductance value of the thin film inductor Z can be increased through increasing the hole diameter of at least one of the first through hole 10H, the second through hole 20H, and the third through hole 30H. The saturation current of the thin film inductor Z can be increased through adjusting the material of at least one of the first magnetic layer M1, the second magnetic layer M2, the third magnetic layer M3, and the fourth magnetic layer M4.

Fifth Embodiment

Figure 6:
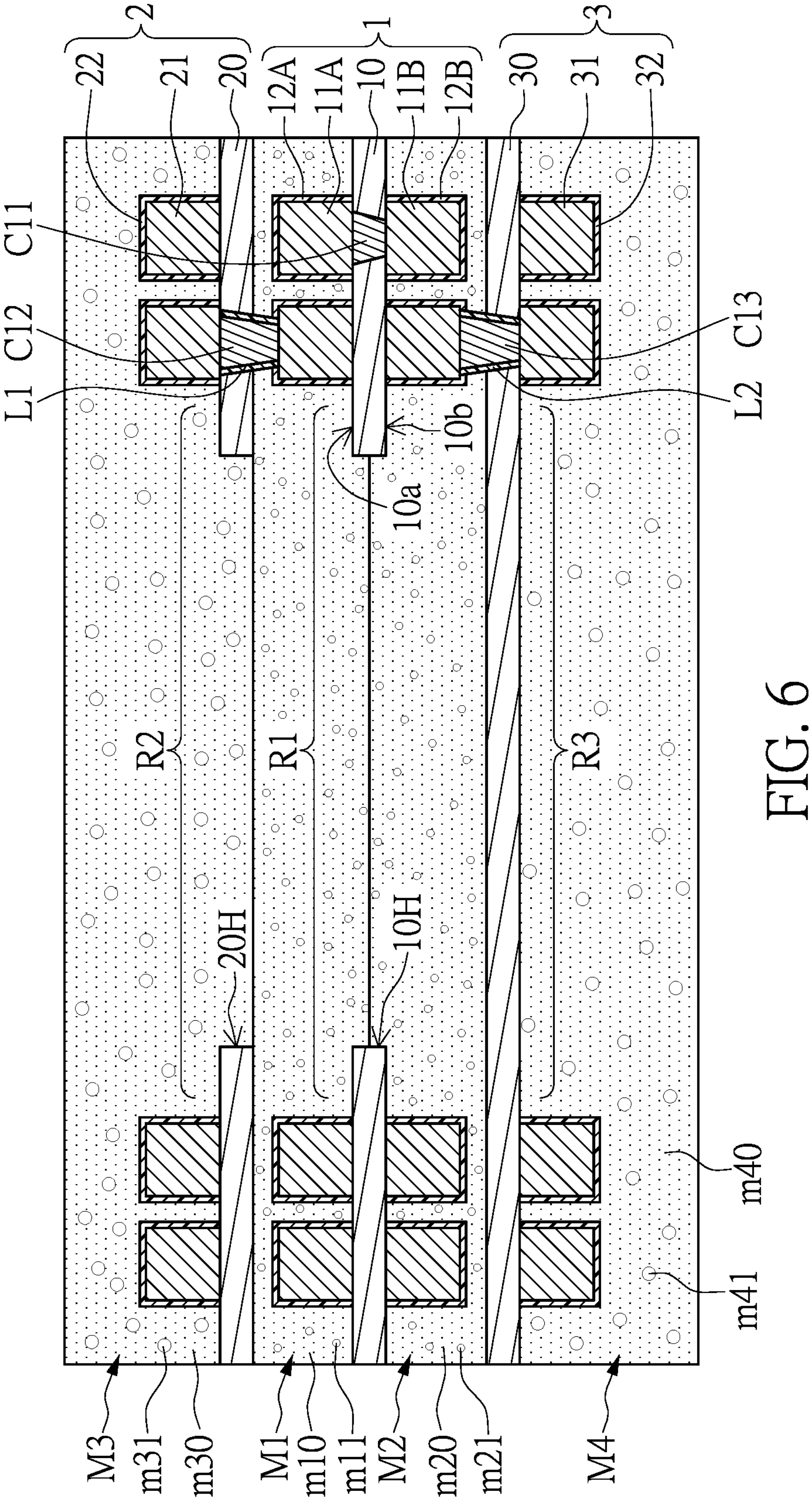
FIG. 6 is a schematic cross-sectional view of a thin film inductor according to a fifth embodiment of the present disclosure.

Referring to FIG. 6, FIG. 6 is a schematic cross-sectional view of a thin film inductor according to a fifth embodiment of the present disclosure. In the present embodiment, components of the thin film inductor that are the same as those of the thin film inductor of the first embodiment have the same reference numerals, and the same components will not be reiterated herein. In the present embodiment, the third substrate 30 does not have the through hole, but the present disclosure is not limited thereto. In another embodiment, the first substrate 10 or the second substrate 20 can also be configured to not have the through hole.

That is to say, at least one of the first substrate 10, the second substrate 20, and the third substrate 30 does not have the through hole. Accordingly, in another embodiment, the first substrate 10 can have the first through hole 10H, but neither the second substrate 20 nor the third substrate 30 has the through hole. In yet another embodiment, the second substrate 20 can have the second through hole 20H, but neither the first substrate 10 nor the third substrate 30 has the through hole. In still another embodiment, the first substrate 10, the second substrate 20, and the third substrate 30 all do not have the through hole.

When any one of the substrates (i.e., the first substrate 10, the second substrate 20, or the third substrate 30) does not have the through hole, the central part of the thin film inductor Z includes a material with a lower magnetic permeability. In this way, compared to the thin film inductor Z of the fourth embodiment, the thin film inductor Z of the present embodiment has a relatively low inductance value but a higher saturation current. Therefore, when the saturation current of the thin film inductor Z needs to be increased, a number of substrates having the through hole can be reduced, so as to lower the magnetic permeability of the central part of the thin film inductor Z.

Sixth Embodiment

Figure 7:
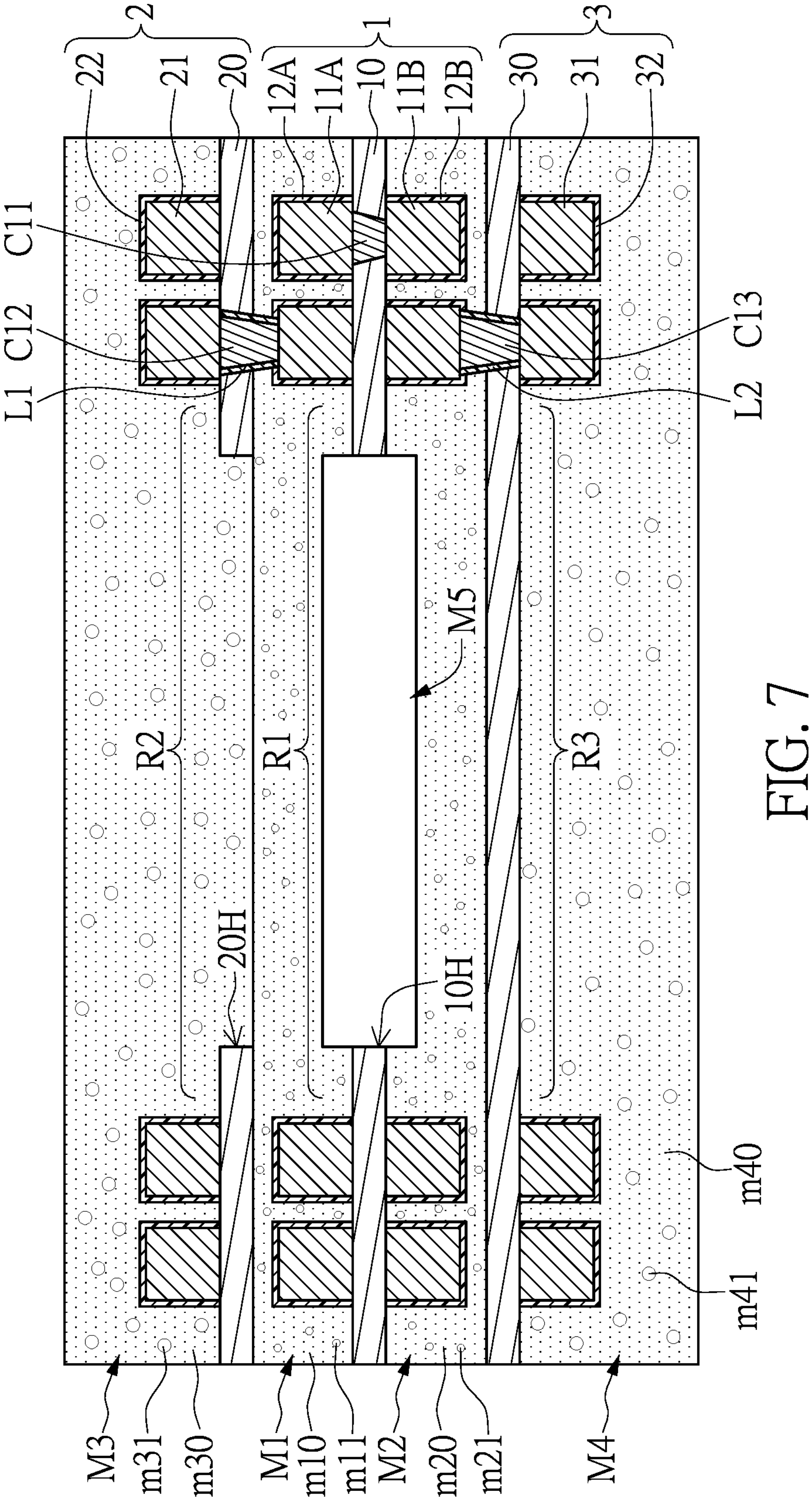
FIG. 7 is a schematic cross-sectional view of a thin film inductor according to a sixth embodiment of the present disclosure.

Referring to FIG. 7, FIG. 7 is a schematic cross-sectional view of a thin film inductor according to a sixth embodiment of the present disclosure. In the present embodiment, components of the thin film inductor that are the same as those of the thin film inductor of the fifth embodiment have the same reference numerals, and the same components will not be reiterated herein.

In the present embodiment, the third substrate 30 does not have the through hole, and the first substrate 10 and the second substrate 20 respectively have the first through hole 10H and the second through hole 20H. In addition, the thin film inductor Z further includes a first magnetic core M5, and the first magnetic core M5 is arranged in the through hole 10H of the first non-circuit layout R1.

In the embodiments of the present disclosure, the thin film inductor Z can have a desired inductance value and a desired saturation current through adjusting magnetic permeability of the first magnetic core M5, the magnetic permeability of the first magnetic layer M1, and the magnetic permeability of the second magnetic layer M2. The magnetic permeability of the first magnetic core M5 and the magnetic permeability of the first magnetic layer M1 (or the magnetic permeability of the second magnetic layer M2) do not have to be the same. In one embodiment, the magnetic permeability of the first magnetic core M5 can be higher than each of the magnetic permeability of the first magnetic layer M1 and the magnetic permeability of the second magnetic layer M2, but the present disclosure is not limited thereto.

In comparison with the first magnetic core M5 and the first magnetic layer M1 having a same magnetic permeability, the thin film inductor Z can have a higher inductance value and a lower saturation current when the magnetic permeability of the first magnetic core M5 is higher than each of the magnetic permeability of the first magnetic layer M1 and the magnetic permeability of the second magnetic layer M2. On the other hand, when the magnetic permeability of the first magnetic core M5 is lower than each of the magnetic permeability of the first magnetic layer M1 and the magnetic permeability of the second magnetic layer M2, the thin film inductor Z can have a higher saturation current and a lower inductance value.

Seventh Embodiment

Figure 8:
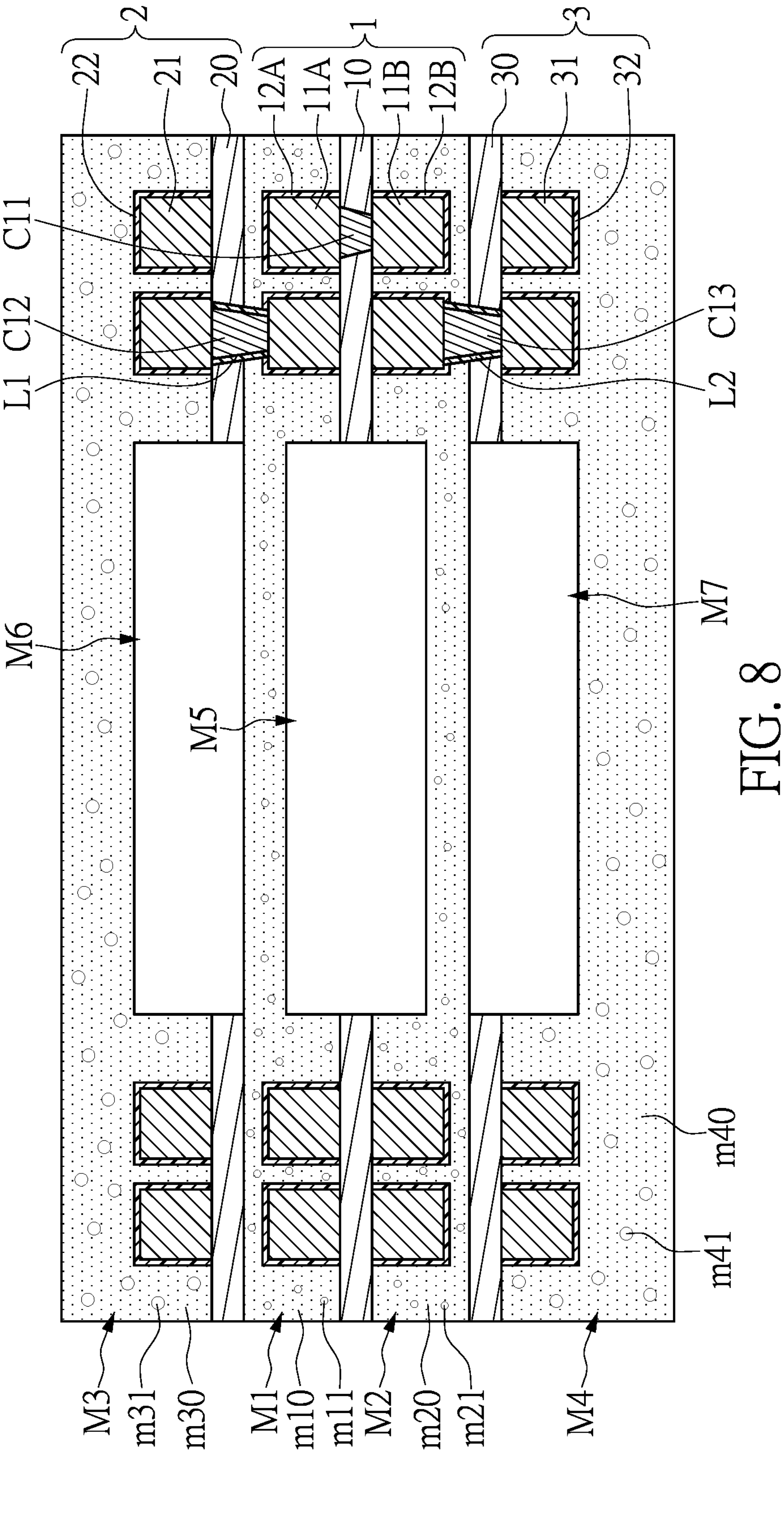
FIG. 8 is a schematic cross-sectional view of a thin film inductor according to a seventh embodiment of the present disclosure.

Referring to FIG. 8, FIG. 8 is a schematic cross-sectional view of a thin film inductor according to a seventh embodiment of the present disclosure. In the present embodiment, components of the thin film inductor that are the same as those of the thin film inductor of the first embodiment have the same reference numerals, and the same components will not be reiterated herein. In the present embodiment, the thin film inductor Z further includes a first magnetic core M5, a second magnetic core M6, and a third magnetic core M7. The first magnetic core M5 is arranged in the first through hole 10H of the first non-circuit layout R1, the second magnetic core M6 is arranged in the second through hole 20H of the second non-circuit layout R2, and the third magnetic core M7 is arranged in the third through hole 30H of the third non-circuit layout R3.

It is worth mentioning that, in the present embodiment, the first magnetic core M5 and the second magnetic core M6 are separate from each through the first magnetic layer M1, and the first magnetic core M5 and the third magnetic core M7 are separate from each through the second magnetic layer M2.

In addition, the magnetic permeability of each of the first to the fourth magnetic layers M1 to M4, magnetic permeability of the first magnetic core M5, magnetic permeability of the second magnetic core M6, and magnetic permeability of the third magnetic core M7 do not have to be the same, and can be adjusted according to the practical requirements. For example, the magnetic permeability of the first magnetic core M5 is greater than each of the magnetic permeability of the first magnetic layer M1 and the magnetic permeability of the second magnetic layer M2, the magnetic permeability of the second magnetic core M6 is greater than the magnetic permeability of the third magnetic layer M3, and the magnetic permeability of the third magnetic core M7 is greater than the magnetic permeability of the fourth magnetic layer M4. That is to say, the magnetic permeability of the central part of the thin film inductor Z is greater than the magnetic permeability of a peripheral part of the thin film inductor Z, which allows the thin film inductor Z to have a higher inductance value.

However, the aforementioned description of the first to the seventh embodiments is merely provided as an example, and is not meant to limit the scope of the present disclosure.

Beneficial Effects of the Embodiments

In conclusion, one of the beneficial effects of the present disclosure is that, in the thin film inductor Z provided by the present disclosure, by virtue of the first substrate 10 having the first non-circuit layout R1, the first electrically conductive circuit 11A or 11B being arranged around the first non-circuit layout R1, and the ratio between the area of the first non-circuit layout R1 and the area of the first substrate 10 being 0.1 or more, the difficulty of manufacturing the thin film inductor Z can be reduced, and the property of the thin film inductor Z can be adjusted according to practical requirements.

Further, compared to the conventional thin film inductors, the area occupied by the first non-circuit layout R1 of the first coil assembly 1 is enlarged, so that the thin film inductor Z can have a higher saturation current.

On the other hand, in one embodiment of the present disclosure, the inductance value of the thin film inductor Z can be increased through arranging multiple ones of the coil assemblies (e.g., the first to the third coil assemblies 1 to 3). That is to say, the inductance value of the thin film Z is not excessively decreased despite the number of turns of each of the electrically conductive circuits (i.e., the first to the third electrically conductive circuits 11A, 11B, 21, and 31) are decreased. Furthermore, since the number of turns of each of the electrically conductive circuits (i.e., the first to the third electrically conductive circuits 11A, 11B, 21, and 31) are decreased, the difficulty of manufacturing the electrically conductive circuit can be reduced.

In addition, through arranging multiple ones of the coil assembly (e.g., the first to the third coil assemblies 1 to 3), a design freedom of the thin film inductor Z can be increased so as to meet different requirements. More specifically, through adjusting the structures of the first to the third non-circuit layouts R1 to R3 and the materials of the first to the third non-circuit layouts R1 to R3, the magnetic permeability of the central part of the thin film inductor Z can be adjusted, thereby allowing the thin film inductor Z to have different properties according the different requirements.

Referring to Table 1 below, simulated data of the thin film inductors of the first embodiment and the seventh embodiment and simulated data of a thin film inductor of a comparative example are shown. It should be noted that, in the simulation, each of the thin film inductors of the first embodiment and the seventh embodiment is set to have a same size as that of the thin film inductor of the comparative example. However, the thin film inductor of the comparative example includes only one coil assembly, while each of the thin film inductors of the first embodiment and the seventh embodiment of the present disclosure includes multiple ones of the coil assemblies (i.e., the first to third coil assemblies 1 to 3). Reference can be made to FIG. 2 and FIG. 8, which respectively show the structures of the thin film inductors of the first embodiment and the seventh embodiment of the present disclosure.

The number of magnetic layers of each of the thin film inductors of the comparative example, the first embodiment of the present disclosure, and the seventh embodiment of the present disclosure are four, such as the first to the fourth magnetic layers M1 to M4 as shown in FIG. 2. However, the thin film inductor of the seventh embodiment includes the magnetic cores with a higher magnetic permeability, such as the first to the third magnetic cores M5 to M7 as shown in FIG. 8.

In addition, the coil assembly of the comparative example has a greater number of turns of the electrically conductive circuit, and a ratio between an area of a non-circuit layout and an area of a substrate of the thin film inductor of the comparative example is 0.0588. With respect to each of the thin film inductors of the first embodiment and the seventh embodiment of the present disclosure, the area of each of the non-circuit layouts of the coil assemblies (e.g., the first non-circuit layout R1) and the area of the substrate (e.g., the first substrate 10) is about 0.264.

TABLE 1

| | Inductance value (μH) | Direct current resistance (mohm) | Saturation current (A) |
|---|---|---|---|
| Comparative example | 0.434 | 156 | 1.53 |
| First embodiment | 0.41 | 158 | 2.66 |
| Seventh embodiment | 0.505 | 158 | 1.65 |

As shown in Table 1, the inductance value of the thin film inductor Z of the first embodiment is slightly lower than that of the thin film inductor of the comparative example, while the thin film inductor Z of the first embodiment has a higher saturation current. That is to say, in the first embodiment of the present disclosure, through increasing the area of the non-circuit layout, the saturation current can be significantly increased in the thin film inductor Z without excessively sacrificing the inductance value.

In addition, compared to the thin film inductors of the comparative example and the first embodiment, the thin film inductor of the seventh embodiment includes the magnetic cores with a higher magnetic permeability, so that the inductance value thereof is higher. However, the saturation current of the thin film inductor Z of the seventh embodiment is still higher than the saturation current of the thin film inductor of the comparative example. Accordingly, in the present disclosure, after the area of the non-circuit layout is increased, the thin film inductor Z of the seventh embodiment can have a higher saturation current even if the inductance value is increased through arrangement of the magnetic cores with a higher magnetic permeability.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A thin film inductor, comprising:

a first coil assembly including a first substrate and two first electrically conductive circuits respectively arranged on two surfaces of the first substrate that are opposite to each other, wherein each of the two first electrically conductive circuits has multiple turns of circuit;

a first magnetic layer;

a second magnetic layer;

a second coil assembly including a second substrate and a second electrically conductive circuit, wherein the first magnetic layer is arranged between the second substrate and the first coil assembly, the second electrically conductive circuit and the first magnetic layer are respectively arranged on two sides of the second substrate that are opposite to each other, and the second electrically conductive circuit is electrically connected in series to one of the two first electrically conductive circuits;

a second electrically conductive column; and a first dielectric layer covering the second electrically conductive column;

wherein the first magnetic layer and the second magnetic layer are respectively arranged on the two surfaces of the first substrate that are opposite to each other, and the two first electrically conductive circuits are respectively embedded in the first magnetic layer and the second magnetic layer;

wherein the first substrate has a first non-circuit layout, each of the two first electrically conductive circuits is arranged around the first non-circuit layout, and a ratio between an area of the first non-circuit layout and an area of the first substrate is between 0.1 and 0.3;

wherein the second electrically conductive circuit is electrically connected to the one of the two first electrically conductive circuits through the second electrically conductive column, the second electrically conductive column passes through the second substrate and the first magnetic layer, and the second electrically conductive column is electrically insulated from the first magnetic layer through the first dielectric layer.

2. The thin film inductor according to claim 1, further comprising:

a first magnetic core arranged in the first non-circuit layout;

wherein magnetic permeability of the first magnetic layer and magnetic permeability of the second magnetic layer are the same, and magnetic permeability of the first magnetic core is different from the magnetic permeability of the first magnetic layer.

3. The thin film inductor according to claim 1, wherein the first substrate includes a first electrically conductive column that passes through the first substrate, and the two first electrically conductive circuits are electrically connected to each other through the first electrically conductive column.

4. The thin film inductor according to claim 1, wherein the first magnetic layer has a first central part arranged in the first non-circuit layout, the second magnetic layer has a second central part arranged in the first non-circuit layout, the first central part has a first recessed surface, the second central part has a second recessed surface, and a projection of the first recessed surface and a projection of the second recessed surface overlap with each other in a vertical direction.

5. The thin film inductor according to claim 1, wherein a part of the first magnetic layer is filled into a gap between any two adjacent turns of circuit of one of the two first electrically conductive circuits, and a part of the second magnetic layer is filled into a gap between any two adjacent turns of circuit of another one of the two first electrically conductive circuits.

6. The thin film inductor according to claim 5, wherein the first magnetic layer includes a first filler and a plurality of first particles that are dispersed in the first filler, the second magnetic layer includes a second filler and a plurality of second particles that are dispersed in the second filler, the plurality of first particles are filled between the two adjacent turns of circuit of the one of the two first electrically conductive circuits, and the plurality of second particles are filled between the two adjacent turns of circuit of the another one of the two first electrically conductive circuits.

7. The thin film inductor according to claim 1, wherein the second substrate has a second non-circuit layout, the second electrically conductive circuit is arranged around the second non-circuit layout, a projection of the second non-circuit layout overlaps with a projection of the first non-circuit layout in a vertical direction, and a ratio between an area of the second non-circuit layout and an area of the second substrate is between 0.1 and 0.3.

8. The thin film inductor according to claim 7, wherein the area of the second non-circuit layout is different from the area of the first non-circuit layout.

9. The thin film inductor according to claim 1, wherein the first substrate has a first through hole, the second substrate has a second through hole, and a projection of an area of the first through hole and a projection of an area of the second through hole at least partially overlap with each other in a vertical direction.

10. The thin film inductor according to claim 9, further comprising:

a first magnetic core arranged in the first through hole of the first substrate; and a second magnetic core arranged in the second through hole of the second substrate;

wherein the first magnetic core and the second magnetic core are separate from each through the first magnetic layer, and magnetic permeability of the first magnetic core is different from magnetic permeability of the second magnetic core.

11. The thin film inductor according to claim 1, wherein a number of turns of the first electrically conductive circuit are 4 or less.

12. The thin film inductor according to claim 1, wherein the first coil assembly further includes two electrically insulating layers respectively covering the two first electrically conductive circuits, and each of the two electrically insulating layers is formed by atomic layer deposition, molecular layer deposition, chemical vapor deposition or an immersion process.

13. The thin film inductor according to claim 1, further comprising:

a third magnetic layer arranged on the second substrate, wherein the second electrically conductive circuit is embedded in the third magnetic layer.

14. The thin film inductor according to claim 13, wherein one of the first substrate and the second substrate has a through hole, and another one of the first substrate and the second substrate does not have the through hole.

15. The thin film inductor according to claim 13, further comprising:

a third coil assembly including a third substrate and a third electrically conductive circuit, wherein the second magnetic layer is arranged between the third substrate and the first coil assembly, the third electrically conductive circuit and the second magnetic layer are respectively arranged on two sides of the third substrate that are opposite to each, and the third electrically conductive circuit is electrically connected in series to another one of the two first electrically conductive circuits; and a fourth magnetic layer arranged on the third substrate, wherein the third electrically conductive circuit is embedded in the fourth magnetic layer.

16. The thin film inductor according to claim 15, wherein at least two of the first magnetic layer, the second magnetic layer, the third magnetic layer, and the fourth magnetic layer are made of different materials or any combination with at least one of different composition, particle size, and hardness.

17. The thin film inductor according to claim 15, wherein a number of turns of the first electrically conductive circuit, a number of turns of the second electrically conductive circuit, and a number of turns of the third electrically conductive circuit are 3 or less.

18. The thin film inductor according to claim 15, further comprising:

a third electrically conductive column; and a second dielectric layer covering the third electrically conductive column;

wherein the third electrically conductive circuit is electrically connected to the another one of the two first electrically conductive circuits through the third electrically conductive column, the third electrically conductive column passes through the third substrate and the second magnetic layer, and the third electrically conductive column is electrically insulated from the second magnetic layer through the second dielectric layer.

* * * * *